G. F. WHITE.
Nursing Apparatus.
No. 196,610. Patented Oct. 30, 1877.
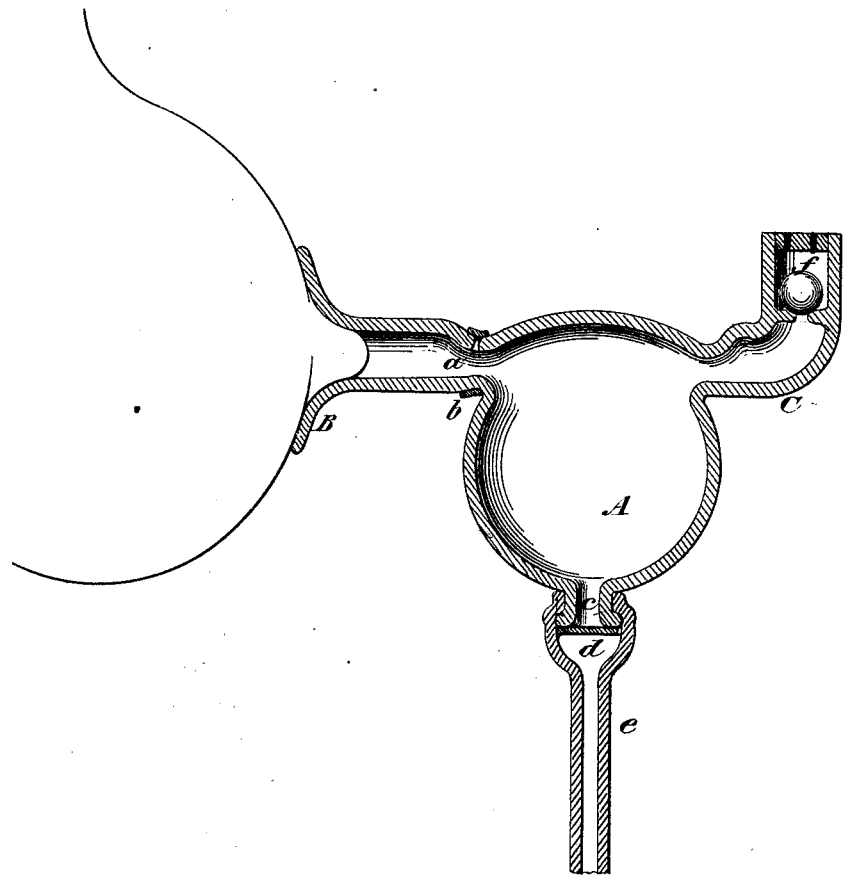
WITNESSES:
Edgar Tate.
J. H. Scarborough.
INVENTOR:
G. F. White.
BY Munn & Co
ATTORNEYS.

UNITED STATES PATENT OFFICE.

GEORGE F. WHITE, OF MIDDLETOWN, NEW YORK.

IMPROVEMENT IN NURSING APPARATUS.

Specification forming part of Letters Patent No. 196,610, dated October 30, 1877; application filed July 23, 1877.

*To all whom it may concern:*

Be it known that I, GEORGE F. WHITE, of Middletown, in the county of Orange and State of New York, have invented a new and Improved Nursing Apparatus, of which the following is a specification:

The invention consists, essentially, in a breast-pump having, in addition to the tube for creating a vacuum in the bulb, a drinking-tube with a nipple attached thereto, so that the infant can draw the milk from the bulb of the pump, as will be hereinafter more fully described.

In the drawing, which is a longitudinal section, A is a bulb, of glass or other suitable material, upon which is the bell-shaped mouth B, formed for receiving the nipple. At the point where this mouth joins the bulb there is a vent-aperture, $a$, which is closed by an elastic band, $b$, which surrounds the neck of the mouth.

At the lower side of the bulb A a nipple, $c$, is formed, which is covered by a valve, $d$, that opens outward, and upon it a flexible tube, $e$, is placed, which is connected with a rubber nipple.

A curved tube, C, projects from the upper portion of the bulb, and is provided with a valve, $f$, which opens upward. A flexible tube is connected with the tube C, and is provided with a mouth-piece.

The manner of using my improved apparatus is as follows: A vacuum is formed in the bulb A by exhausting the air through the tube C, by means of the mouth. The milk then flows from the breast into the bulb. When a sufficient quantity of milk is extracted, the vent-aperture $a$ is opened, and the child is allowed to take the milk through the tube $e$, while it is still warm.

By the use of this apparatus sore nipples are avoided, and the child is fed with the mother's milk while it is fresh.

Having thus described my invention, I claim as new and desire to secure by Letters Patent—

The combination of the drinking-tube $e$ and valve $d$ with the bulb A, having the neck $c$, mouth B, air-exhausting tube C, and valves $b$ $f$, as and for the purpose set forth.

GEORGE F. WHITE.

Witnesses:
   HENRY W. WIGGINS,
   JEROME P. UPTEGROVE.